(12) United States Patent
Choi et al.

(10) Patent No.: US 7,044,628 B2
(45) Date of Patent: May 16, 2006

(54) BACKLIGHT UNIT

(75) Inventors: Jin-seung Choi, Suwon (KR);
Hwan-young Choi, Anyang (KR);
Jee-hong Min, Yongin (KR); Su-mi Lee, Suwon (KR); Jin-hwan Kim, Suwon (KR); Moon-gyu Lee, Suwon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 10/452,583

(22) Filed: Jun. 3, 2003

(65) Prior Publication Data

US 2004/0130879 A1    Jul. 8, 2004

(30) Foreign Application Priority Data

Jan. 7, 2003    (KR)    ............ 10-2003-0000781

(51) Int. Cl.
*F21V 7/04*    (2006.01)

(52) U.S. Cl. .............. 362/628; 362/615; 362/339

(58) Field of Classification Search ............ 362/31, 362/555, 558, 330; 359/1
See application file for complete search history.

(56) References Cited

U.S. PATENT DOCUMENTS

| 6,196,691 | B1 * | 3/2001 | Ochiai .................. 362/31 |
| 6,301,026 | B1 | 10/2001 | Ueda |
| 6,464,366 | B1 * | 10/2002 | Lin et al. .............. 362/31 |
| 6,505,946 | B1 * | 1/2003 | Suzuki et al. ........... 362/31 |
| 6,582,095 | B1 * | 6/2003 | Toyoda ................ 362/235 |
| 6,700,634 | B1 * | 3/2004 | Taniguchi et al. ........ 349/65 |
| 6,733,147 | B1 * | 5/2004 | Wang et al. ............ 362/26 |

FOREIGN PATENT DOCUMENTS

| EP | 03011835 | * | 6/1998 |
| JP | 2001-143512 A | | 5/2001 |
| KR | 20010008540 A | | 2/2001 |
| KR | 10-0300538 B1 | | 6/2001 |
| KR | 2002-70243 A | | 9/2002 |
| WO | WO 98/26212 A1 | | 6/1998 |

* cited by examiner

*Primary Examiner*—Ali Alavi
(74) *Attorney, Agent, or Firm*—Sughrue Mion, PLLC

(57) ABSTRACT

A backlight unit includes a point light source emitting light and a light guide panel including a holographic pattern formed to have a concentric circle shape having a center at the point light center. Thus, since the incident azimuth angle of light incident on the holographic pattern can be made constant, an efficiency of light exhausted through the light exhaust surface can be improved. Also, since the distribution of the exhaust azimuth angle of the exhaust light can be made uniform, a uniform brightness can be obtained from the exhaust surface.

23 Claims, 9 Drawing Sheets

BACKLIGHT UNIT

BACKGROUND OF THE INVENTION

This application claims the priority of Korean Patent Application No. 2003-781 filed on Jan. 7, 2003, in the Korean Intellectual Property Office, the disclosure of which is incorporated herein in its entirety by reference.

1. Field of the Invention

The present invention relates to a backlight unit, and more particularly, to an edge light type backlight unit using a light guide panel (LGP).

2. Description of the Related Art

Since a light receiving type flat panel display device such as a liquid crystal display device forms an image not by emitting light by itself but by receiving light from the outside, the image cannot be viewed in a dark place. Thus, a backlight unit for emitting light is installed at a rear surface of the light receiving type flat panel display device.

The backlight units can be classified into direct light types and edge light types according to the type of arrangement of a light source. The edge light type light source can use a linear light source and a point light source as a light source. As a typical linear light source, there is a cold cathode fluorescent lamp (CCFL) in which electrodes are installed inside a tube at both end portions. A light emitting diode (LED) is a typical linear light source. The CCFL can emit a strong white light and obtain a high brightness and a high uniformity. Also, the CCFL can enable a device of a large size design. However, the CCFL is disadvantageous since it is operated by a high frequency AC signal and has a narrow operational temperature range. The LED exhibits a lower performance in brightness and uniformity compared to the CCFL, but is operated by a DC signal and has a long life span and a wide operational temperature range. Further, the LED can be manufactured in a thin shape.

FIG. 1 is a perspective view illustrating a conventional edge light type backlight unit using a point light source. FIG. 2 is a sectional view illustrating the edge light type backlight unit shown in FIG. 1.

Referring to FIG. 1, three LEDs 20 are installed at an edge 11 of a light guide panel 10 as point light sources. A holographic pattern 30 for making the light emitted from the LEDs 20 proceed through a light exhaust surface 12 is formed on a lower surface of the light guide panel 10. Although not shown in the drawing, there is a diffusion panel for diffusing the light exhausted from the light exhaust surface 12 and a prism panel for improving brightness of the diffused light in a direction perpendicular to the light exhaust surface 12.

The LEDs 20, as shown in FIG. 3, emits light in a range between 0–±90°. The light emitted from each of the LEDs 20 is incident on the light guide panel 10 through the edge 11 and then input to the holographic pattern 30. The holographic pattern 30 having a diffraction grid structure formed perpendicular to an optical axis 21 changes the incident light to a surface light and makes the surface light proceed through the light exhaust surface 12 which is an upper surface of the light guide panel 10. The holographic pattern 30 can emit light at the highest efficiency when the light is incident on the holographic pattern 30 at an angle of 90°. Also, as the distribution of an incident azimuth angle of the light incident on the holographic pattern 30 decreases, a uniform brightness can be obtained at the light exhaust surface 12. If the brightness of the light exhaust surface 12 is not uniform, a screen appears to be smeared. In a narrow range of about 1 centimeter, a change in brightness of about 0.9 is detected as a smear. However, when the brightness changes gradually from the central portion of the screen to an edge portion thereof, a change in brightness of about 0.8 is not detected as a smear. Thus, a uniformity of brightness over 0.8 is needed. In particular, to obtain a quality image, a uniformity of brightness over 0.9 is needed.

FIG. 4 shows the distribution of the output of light by the conventional backlight unit shown in FIG. 1. The light guide panel 10 is divided into three portions, that is, a near portion 40, a middle portion 50, and a far portion 60, sequentially from the edge 11 where the LEDs 20 are installed, where the distribution of the output of light is shown. Referring to FIG. 4, the middle portion 50 and the far portion 60 have a wider light output distribution compared to the near portion 40.

FIG. 5 is a graph showing the brightness at the light exhaust surface 12 by the edge light type backlight unit shown in FIG. 1. In the graph, the vertical axis indicates brightness and the horizontal axis indicates FWHM (full width half maximum) showing a light exhaust angle at the light exhaust surface 12. Three curves C1, C2, and C3 from the left side indicate the brightness of the near portion 40, the middle portion 50, and the far portion 60, respectively. Referring to FIG. 5, it can be seen that the brightness of the near portion 40 is greater than those of the middle portion 50 and the far portion 60. The FWHM of the near portion 40 is 20°/20° while those of the middle portion 50 and the far portion 60 are 20°/35° which are relatively wider than that of the near portion 40. In 20°/35°, the first angle "20°" and the second angle "35°" denote FWHMs in an X direction and a Y direction, respectively.

The irregularity of brightness exists because the distribution of an incident azimuth angle of the light incident on the holographic pattern 30 is different in each of the near portion 40, the middle portion 50, and the far portion 60 so that an efficiency in the light emission by the holographic pattern 30 and the distribution of an exhaust azimuth angle of the exhaust light are different in the three portions.

SUMMARY OF THE INVENTION

To solve the above and/or other problems, the present invention provides a backlight unit which can reduce the incident azimuth angle range of light incident on a holographic pattern in a light guide panel.

According to an aspect of the present invention, a backlight unit comprises a point light source emitting light and a light guide panel including a holographic pattern formed to have a concentric circle shape having a center at the point light source.

The holographic pattern is formed on at least one of a bottom surface of the light guide panel and an upper surface of the light guide panel facing the bottom surface.

The point light source is installed at a corner of the light guide panel.

According to anther aspect of the present invention, a backlight unit comprises a point light source emitting light and a light guide panel including a diffraction grating having a shape of a polygon inscribed inside a concentric circle having a center at the point light source.

The diffraction grating is formed on at least one of a bottom surface of the light guide panel and an upper surface of the light guide panel facing the bottom surface.

The point light source is installed at a corner of the light guide panel and close to an edge of the light guide panel.

BRIEF DESCRIPTION OF THE DRAWINGS

The above and other features and advantages of the present invention will become more apparent by describing in detail illustrative, non-limiting embodiments thereof with reference to the attached drawings in which.

DETAILED DESCRIPTION OF THE INVENTION

Figure 6:
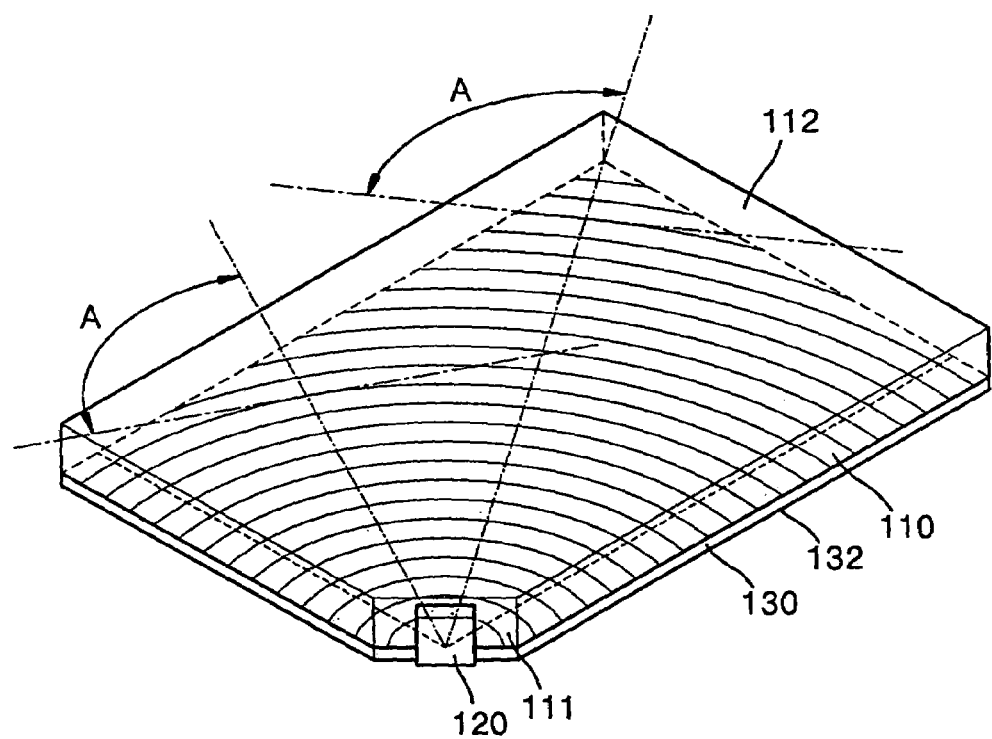
FIG. 6 is a perspective view illustrating a backlight unit according to an exemplary embodiment of the present invention.

Referring to FIG. 6, an LED 120 is installed at a corner of a light guide panel 110 as a point light source. The light guide panel 110 is manufactured of a light transmitting transparent material. Typically, acryl based transparent resin (PMMA) exhibiting a refractive index of about 1.49 and a specific gravity of about 1.19 is used, or olefin based transparent resin exhibiting a special gravity of about 1.0 is used for its light weight. The light guide panel 110 is usually about 2–3 mm thick and may have a wedge shape so that the thickness of the light guide panel 110 decreases from an edge on which light is incident to the opposite edge to reduce the weight thereof. The size of the light guide panel 110 is dependent on the size of an image display device (not shown), for example, an LCD (liquid crystal display), which is installed at a light exhaust surface 112.

Figure 3:
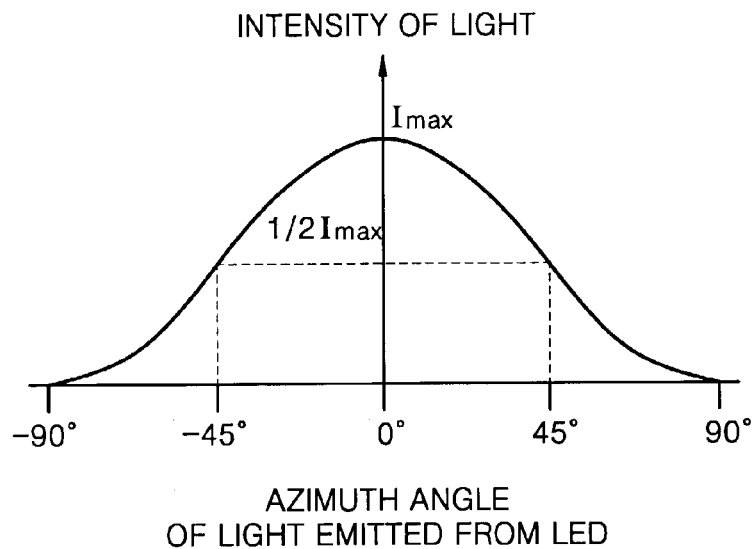
FIG. 3 is a graph showing an azimuth angle of the light emitted from an LED.
Figure 4:
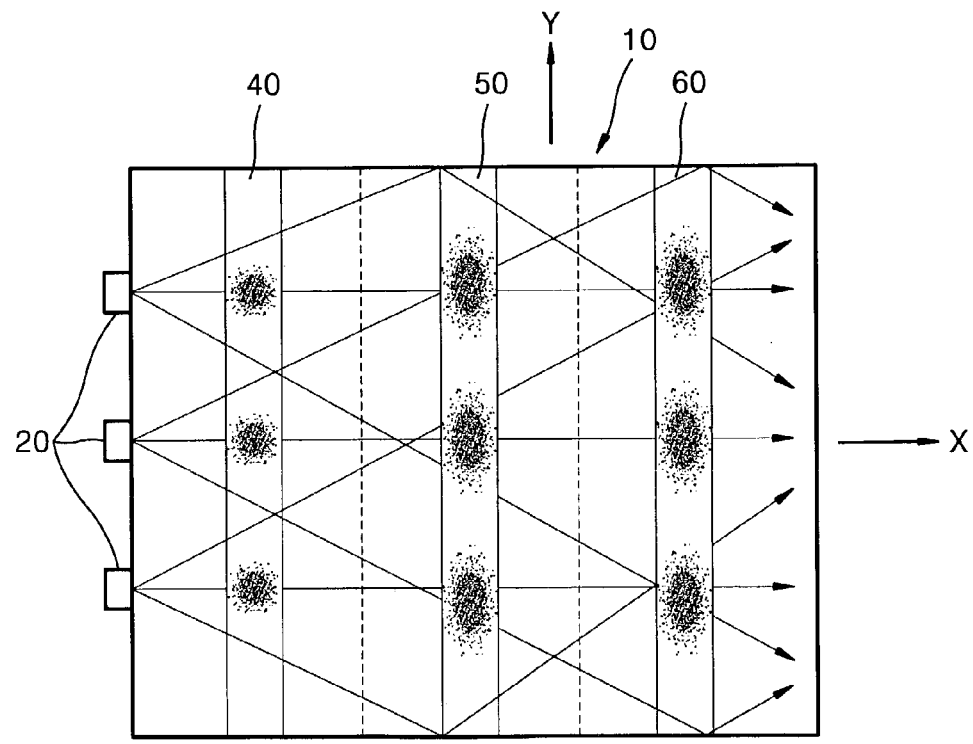
FIG. 4 is a view illustrating the distribution of the output of light by the backlight unit of FIG. 1.
Figure 5:
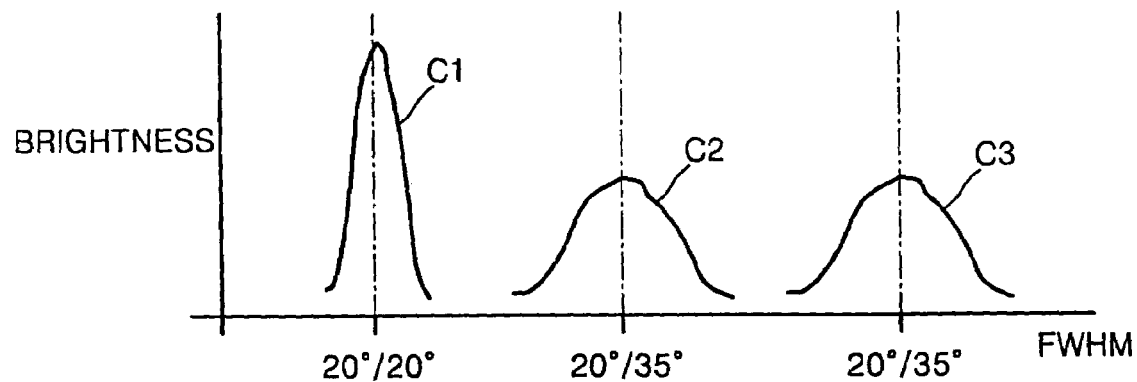
FIG. 5 is a view showing the brightness at a light exhaust surface by the backlight unit of FIG. 1.

The LED 120 which is an example of a point light source, emits light approximately in a range between 0–±90° with respect to an optical axis as shown in FIG. 3. An angle at which light having an intensity corresponding to the half (Imax/2) of the maximum value (Imax) of the intensity of light is referred as an FWHM. For an LED, the FWHM is about ±45°. For example, a 1-chip-2-LED type or a 2-chip-1-LED type can be used for the LED 120. An appropriate LED can be used according to a required brightness.

The LED 120 is installed at a corner of the light guide panel 110. The corner of the light guide panel 110 is chamfered, as shown in FIG. 6. The LED 120 is preferably, but not necessarily, installed so as to emit light to a light incident surface 111 formed by chamfering.

A holographic pattern 130 is formed at the light guide panel 110. The holographic pattern 130 is a diffracting grating which diffracts the light emitted from the LED 120 and incident on the light guide panel 110 so as to be exhausted through the light exhaust surface 112. The holographic pattern 130 is formed on a bottom surface of the light guide panel 110 forming concentric circles having the center at the LED 120. A reflection panel 132 for reflecting the light diffracted by the holographic pattern 130 upward is provided at a lower surface of the holographic pattern 130. The diffraction grating preferably, but not necessarily, has a period of about 2 m or less and may have a period of about 0.4 m and a depth of about 0.2 m, for example. The period means an interval between the concentric circles. The period and depth are not limited to the above values and can be appropriately adjusted to make the distribution of the output of light at the light exhaust surface 112 uniform. The holographic pattern 130 can also be formed on an upper surface facing the bottom surface of the light guide panel 110.

Figure 7:
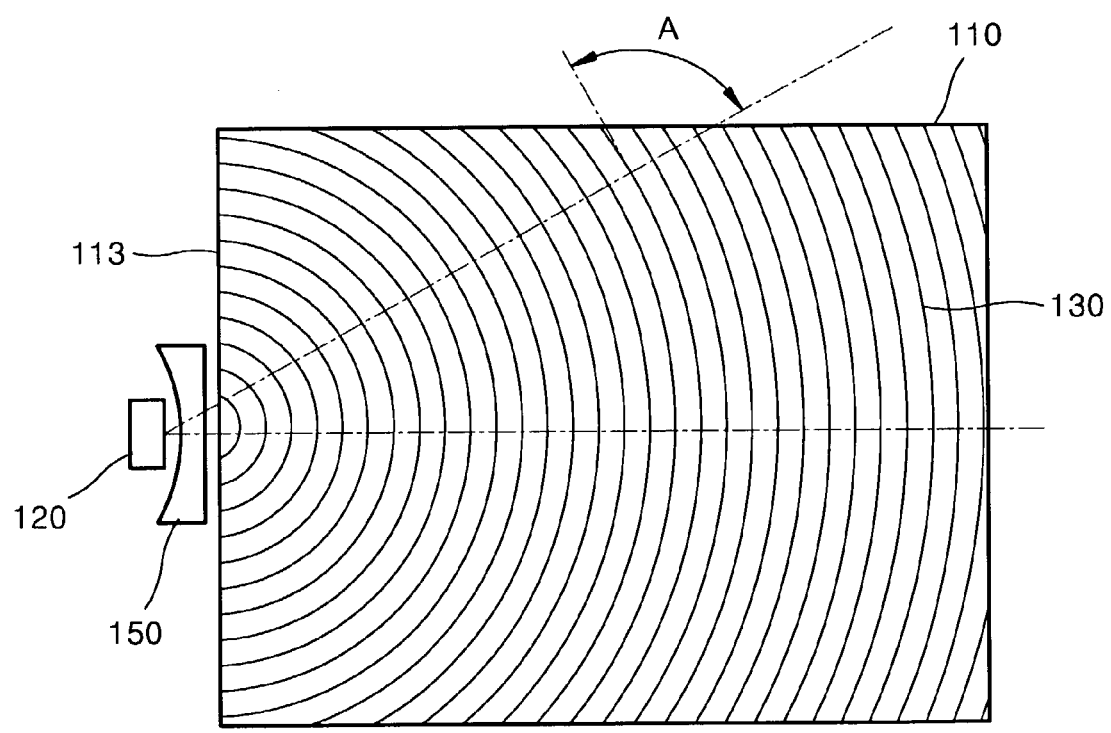
FIG. 7 is a plan view illustrating a backlight unit according to another exemplary embodiment of the present invention.

FIG. 7 is a plan view illustrating a backlight unit according to another exemplary embodiment of the present invention. Referring to FIG. 7, the LED 120 is installed at a left edge 113 of the light guide panel 110. The LED 120 can be installed at the other edges of the light guide panel 110. The holographic pattern 130 is the above-described diffraction grating and is formed on the bottom surface and/or the upper surface of the light guide panel 110, forming concentric circles having the center at the LED 120. A diffusion member 150 for diffusing the light emitted from the LED 120 can be further provided between the LED 120 and the light guide panel 110. A concave lens, for example, may be used as the diffusion member 150. The diffusion member 150 diffuses the light emitted from the LED 120 so that the light is incident on the entire area of the left edge 113 of the light guide panel 110 at a maximum angle.

In the operation and effect of the backlight unit according to the above-described exemplary embodiments of the present invention, the light emitted from the LED 120 is incident on the light guide panel 110 through the light incident surface 111 and proceeds in a radial direction. The light is diffracted by the holographic pattern 130 in the light guide panel 110 and reflected by the reflection panel 132 to be exhausted through the light exhaust surface 112. The diffusion panel (not shown) for diffusing the light output from the light exhaust surface 112 to be emitted with a uniform intensity is further provided above the light guide panel 110. The light passing through the diffusion panel is incident on a flat display device such as a LCD device (not shown), which is disposed above the diffusion panel.

The holographic pattern 130 emits light at the highest efficiency when the light is incident at an angle of about 90° with respect to the holographic pattern 130. In the above-described exemplary embodiments, the holographic pattern 130 is formed as concentric circles having the center at the LED 120. An incident azimuth angle A of light incident on the holographic pattern 130 is almost 90° at an arbitrary point in the light guide panel 110 and is almost uniform. Thus, the holographic pattern 130 can emit light to the light exhaust surface 112 by diffracting the light at the maximum efficiency. Also, since the azimuth angle of the light exhausted to the light exhaust surface 112 is about 80° or more with respect to the light exhaust surface 112, preferably, but not necessarily, at a uniform angle of almost 90°, the intensity of the exhaust light can be easily adjusted and the brightness at the light exhaust surface 112 is made uniform.

Figure 1:
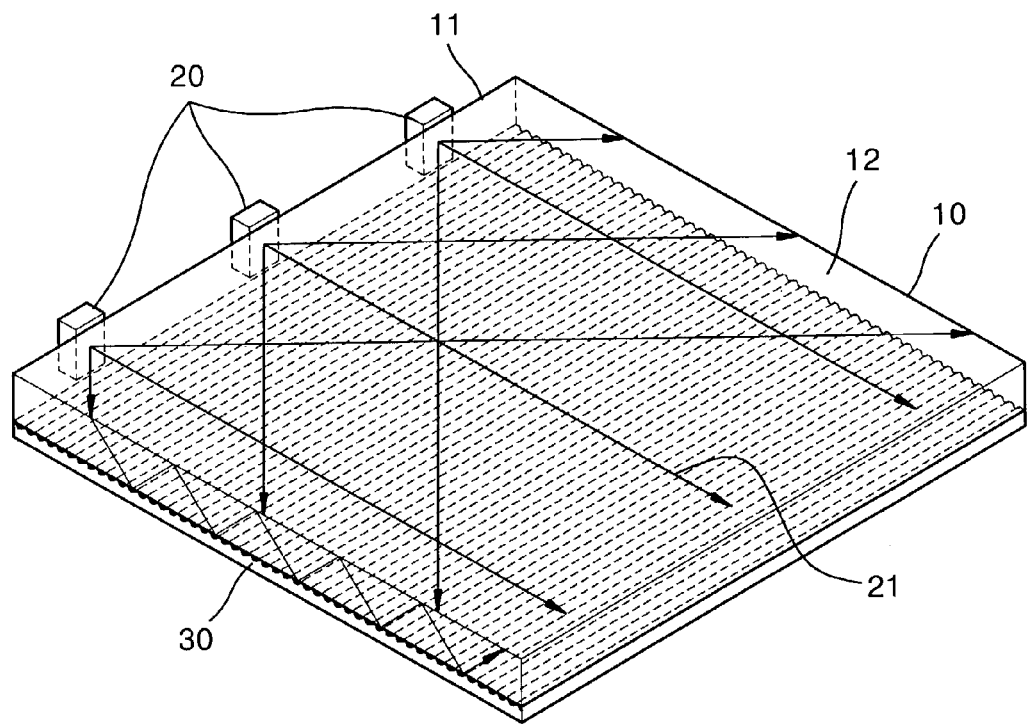
FIG. 1 is a perspective view illustrating a conventional edge light type backlight unit using a point light source.
Figure 2:
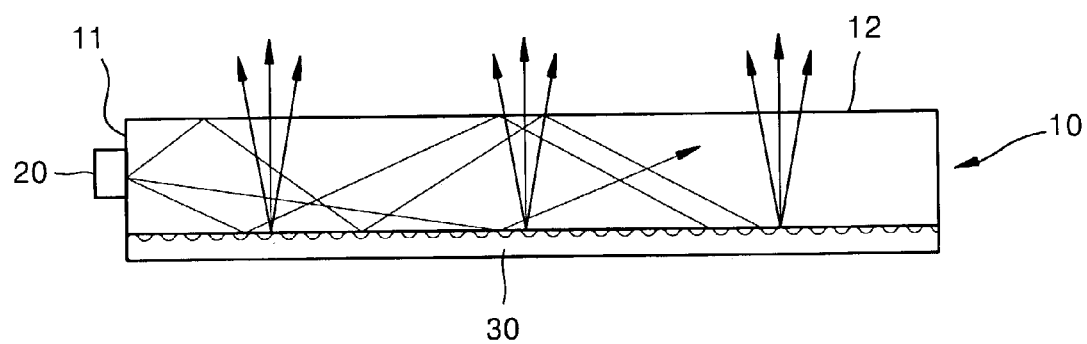
FIG. 2 is a sectional view illustrating the backlight unit of FIG. 1.

Typically, the conventional backlight unit shown in FIG. 1 includes a diffusion panel (not shown) for diffusing light emitted from the light exhaust surface 12 and a prism panel (not shown) for improving brightness of the diffused light in a normal direction thereof, that is, in a direction perpendicular to the light exhaust surface 112. In most cases, two prism panels are typically used and the prism panels are arranged such that the prism patterns of the prism panels cross each other perpendicularly. In the above exemplary embodiments, however, since the light is emitted to the light exhaust surface 112 almost by 90°0 with respect to the light exhaust surface 112, the prism panel is not needed. Thus, in the course of a passage of the light from the LED 120 to the flat display device, the number of media through which the light passes can be reduced. As a result, the amount of light absorbed by each medium is reduced so that an efficiency of use of light can be improved.

Figure 8:
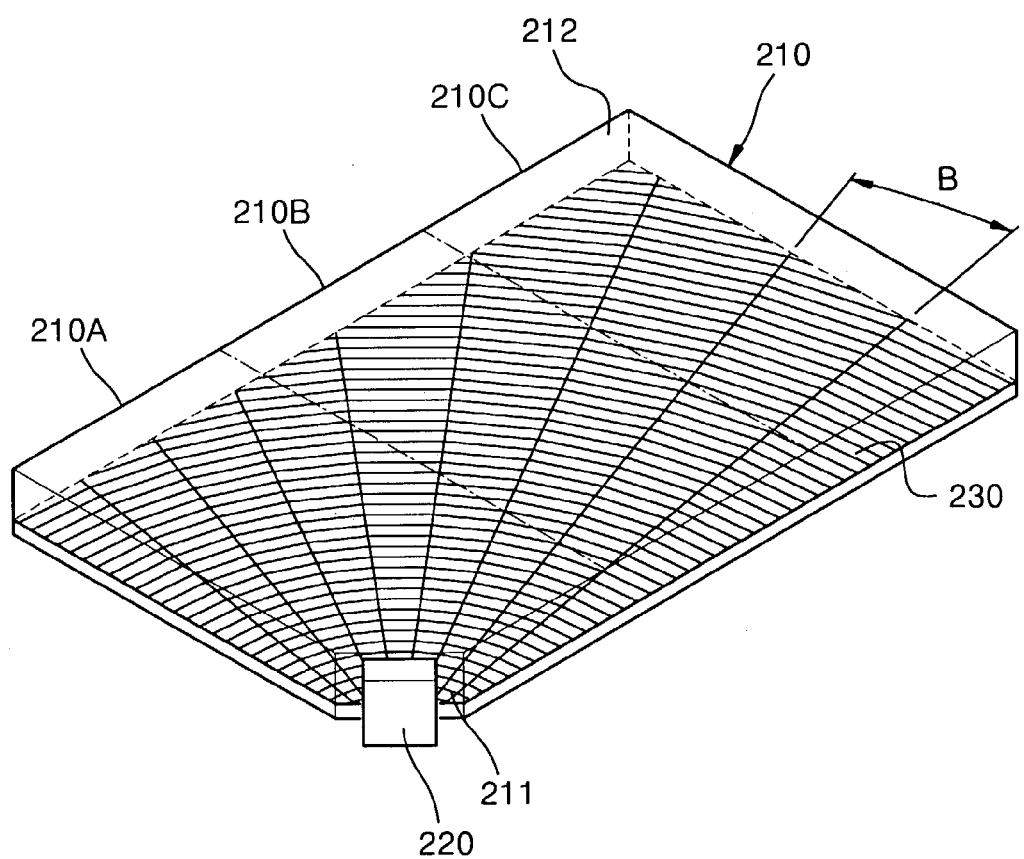
FIG. 8 is a perspective view illustrating a backlight unit according to yet another exemplary embodiment of the present invention.

FIG. 8 is a perspective view illustrating a backlight unit according to yet another exemplary embodiment of the present invention. Referring to FIG. 8, an LED 220 is installed at a corner of a light guide panel 210 as a point light source. A holographic pattern 230 is formed on a bottom surface of the light guide panel 210 or an upper surface thereof facing the bottom surface. Although not shown in the drawing, a reflection panel for reflecting light can be further provided under the holographic pattern 230.

The light guide panel 210 can be manufactured from a transparent material such as acryl based transparent resin PMMA or olefin based transparent resin which transmits light, like the light guide panel 110 as shown in FIG. 6. The corner is chamfered as shown in FIG. 8 and the LED 220 is preferably, but not necessarily, installed to emit light to an incident light surface 211 formed by chamfering.

The holographic pattern 230 diffracts the light emitted from the LED 220 and incident on the light guide panel 210 and emits the diffused light toward the light exhaust surface 212. Diffracting grating has a shape of a polygon inscribed inside a concentric circle having the center at the LED 220. The diffracting grating can be formed to have an equilateral polygonal shape in which the central angles of all sides are identical. Also, the diffracting grating can be formed into polygonal shapes in which each side has a different central angle.

The diffracting grating according to the present exemplary embodiment has an equilateral polygonal shape in which the central angle B of each side is about 10°. In this case, the distribution of an incident azimuth angle of the light incident on the holographic pattern 230 in the entire area in the light guide panel 210 is within about 90±5° with respect to the holographic pattern 230. As the central angle B decreases, the distribution of an incident azimuth angle of the light incident on the holographic pattern 230 decreases so that the distribution is close to a concentric circle having the center at the LED 120 as shown in FIG. 6.

Whether to make the shape of the diffracting grating an equilateral polygon and how to set the central angle can be appropriately determined by considering the uniformity of brightness required by the light exhaust surface 212 and an efficiency of the use of light.

Figure 9:
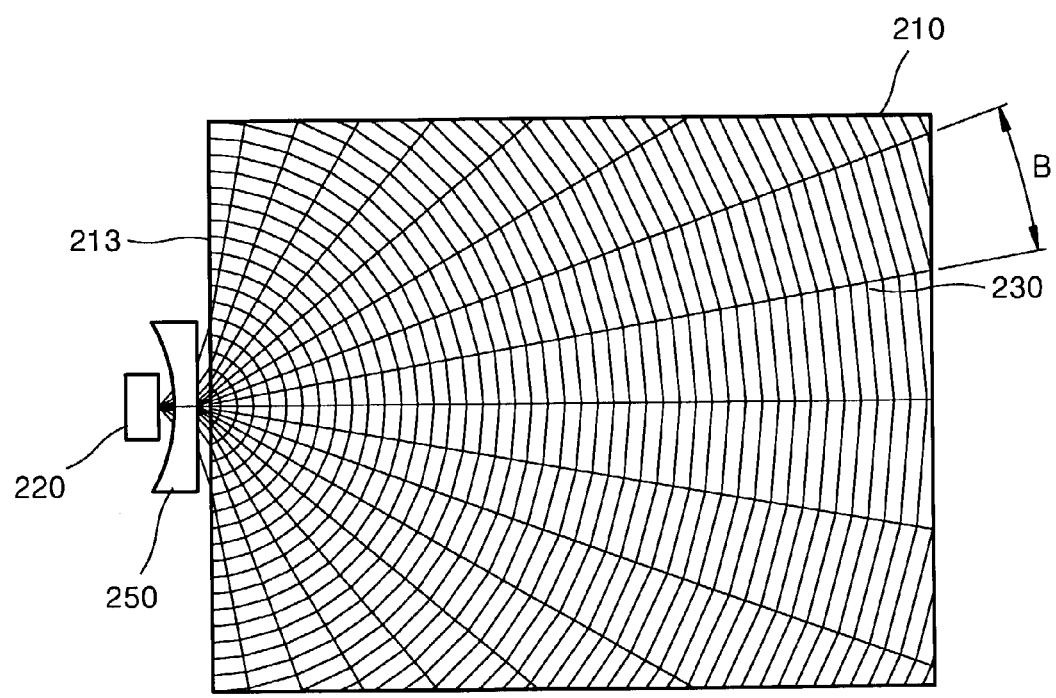
FIG. 9 is a plan view illustrating a backlight unit according to further yet another exemplary embodiment of the present invention.

In the present exemplary embodiment, as shown in FIG. 9, the LED 220 can be installed at an edge of the light guide panel 210, and a diffusion member 250 such as a concave lens for diffusing light can be further provided between the LED 220 and the light guide panel 210.

Figure 10:
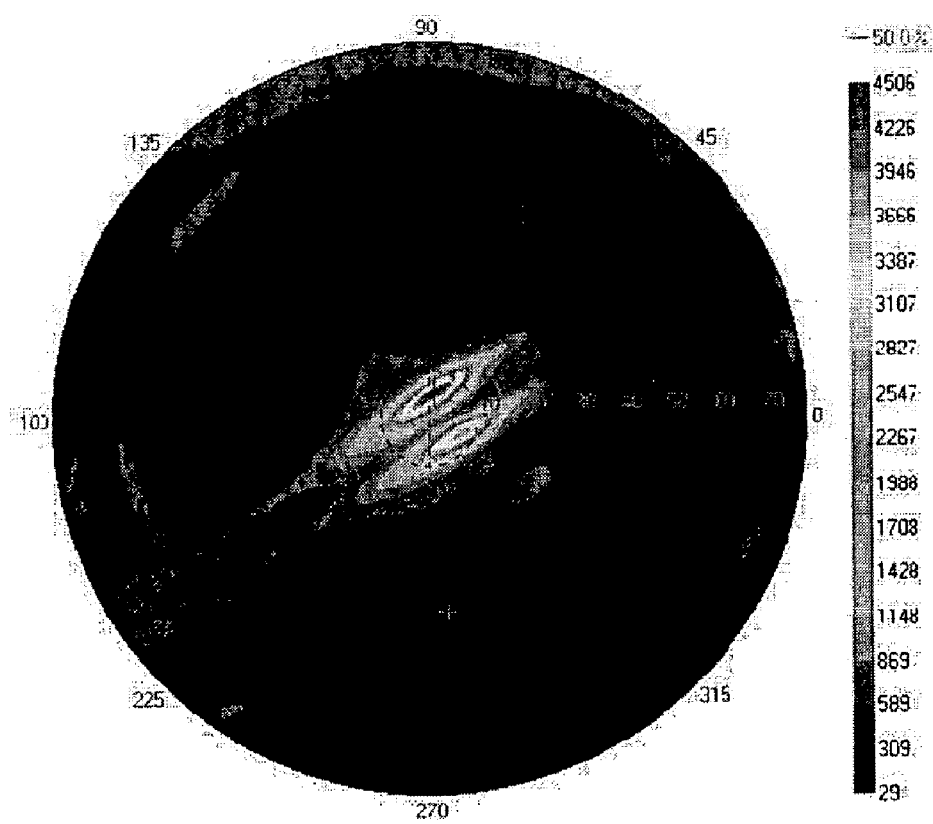
FIGS. 10, 11, and 12 are graphs showing the results of measurements of the distribution of brightness at a light exhaust surface in each of three areas of the light guide panel in the exemplary embodiment shown in FIG. 8.
Figure 11:
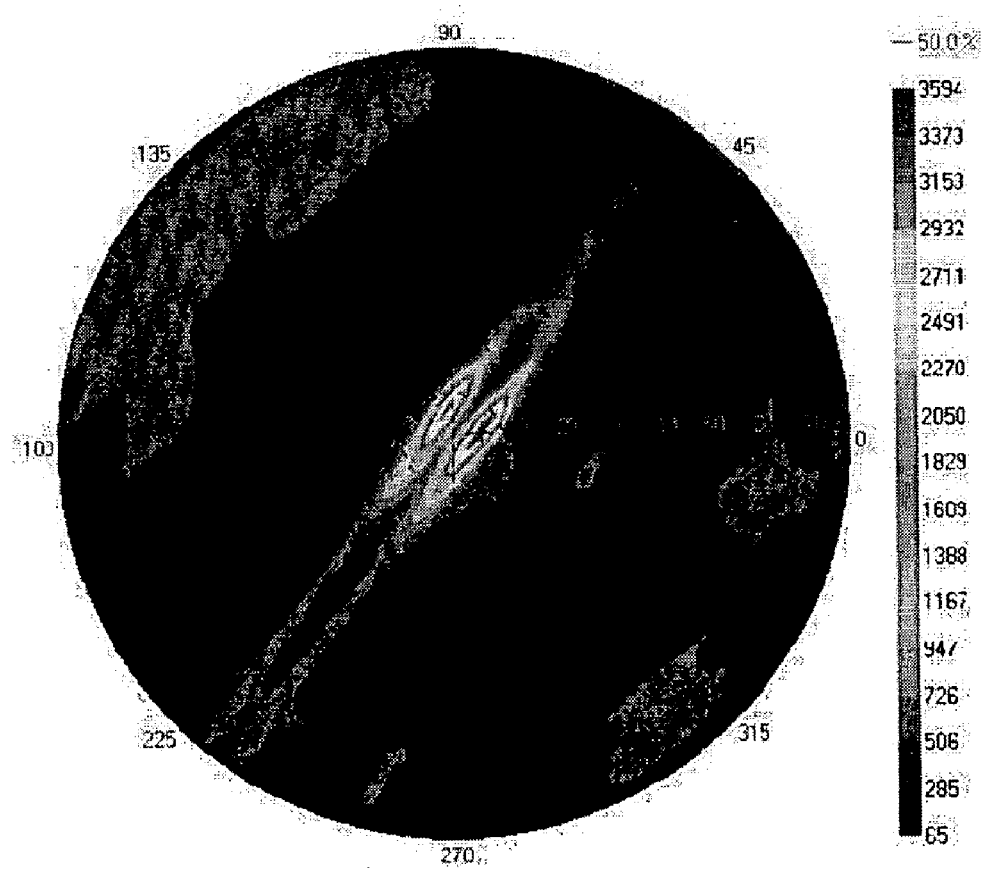
Figure 12:
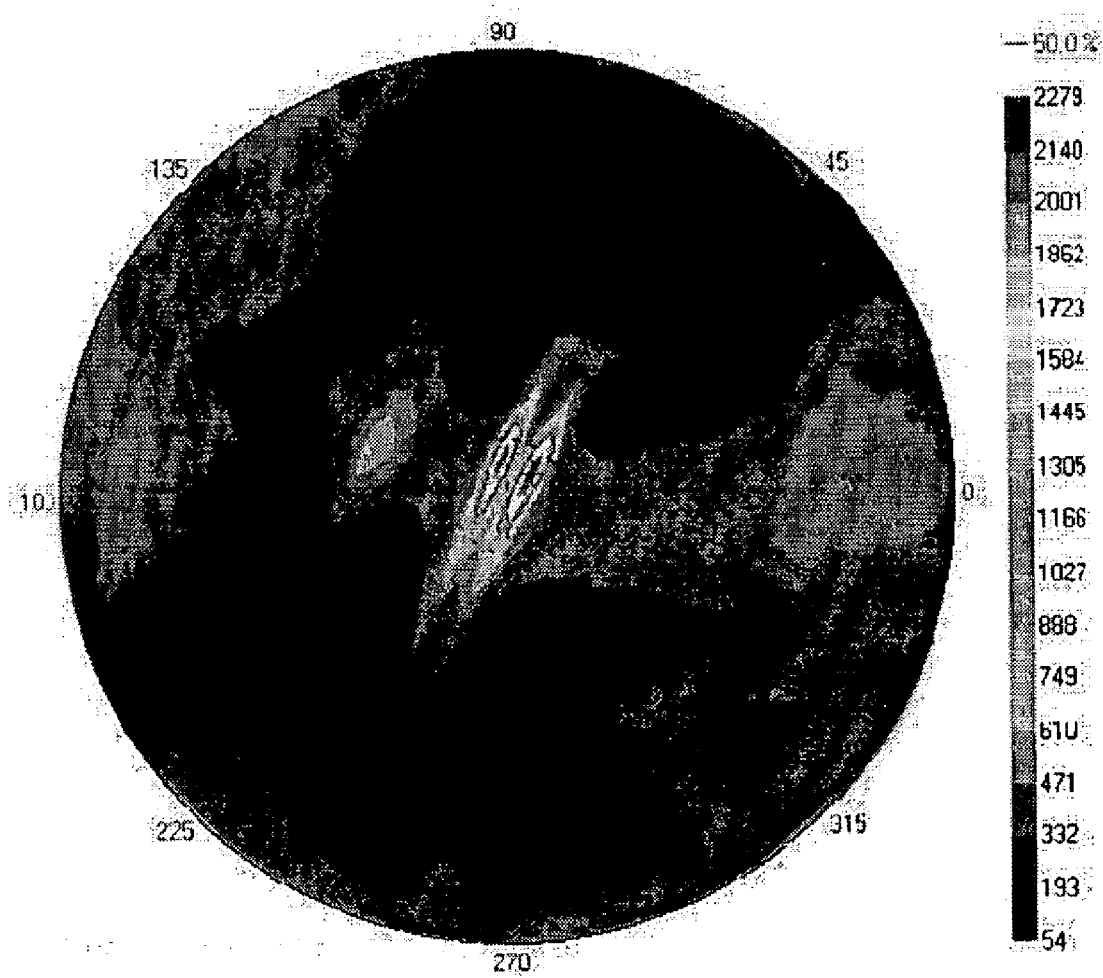

FIGS. 10, 11, and 12 are graphs showing the results of measurements of the distribution of brightness at a light exhaust surface in each of three areas 210A, 210B, and 210C, respectively, of the light guide panel in the exemplary embodiment shown in FIG. 8. The distributions of brightness shown in FIGS. 10 through 12 are those of light prior to being diffused by the diffusion panel (not shown). Referring to FIGS. 10 through 12, it can be seen that the distribution of brightness is concentrated at the central portion of each graph and there is little difference in the distribution of brightness according to the area. This means that an incident azimuth angle of light incident on the holographic pattern 230 is almost concentrated at around 90°. Thus, when a diffusion panel is installed at the light exhaust surface 212, almost uniform distribution of brightness can be obtained from the entire area of the light exhaust surface 212.

As described in the above, according to the backlight unit according to an exemplary embodiment of the present invention, since the incident azimuth angle of light incident on the holographic pattern can be made constant, an efficiency of light exhausted through the light exhaust surface can be improved. Also, since the distribution of the exhaust azimuth angle of the exhaust light can be made uniform, a uniform brightness can be obtained from the exhaust surface.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A backlight unit comprising:
    a point light source emitting light; and
    a light guide panel including a holographic pattern formed to have a concentric circle shape having a center at the point light source, wherein the holographic pattern comprises a diffraction grating having a period of about 2 µm or less and a depth of about 0.2 µm or less.

2. A backlight unit comprising:
    a point light source emitting light; and
    a light guide panel including a holographic pattern formed to have a concentric circle shape having a center at the point light source, wherein the holographic pattern is formed on a bottom surface of the light guide panel and an upper surface of the light guide panel facing the bottom surface.

3. The backlight unit as claimed in claim 1, wherein the point light source is installed at a corner of the light guide panel.

4. The backlight unit as claimed in claim 3, wherein the corner is chamfered.

5. The backlight unit as claimed in claim 1, wherein the point light source is installed at an edge of the light guide panel.

6. The backlight unit as claimed in claim 1, wherein a diffusion member diffusing light emitted from the point light source is further provided between the point light source and the light guide panel.

7. A backlight unit comprising:
    a point light source emitting light; and
    a light guide panel including a diffraction grating having a shape of a polygon inscribed inside a concentric circle having a center at the point light source.

8. The backlight unit as claimed in claim 7, wherein the diffraction grating has a shape of a polygon in which a central angle of each side is not more than about 10°.

9. The backlight unit as claimed in claim 7, wherein the diffraction grating has a shape of an equilateral polygon.

10. The backlight unit as claimed in claim 7, wherein the diffraction grating is formed on at least one of a bottom surface of the light guide panel and an upper surface of the light guide panel facing the bottom surface.

11. The backlight unit as claimed in claim 7, wherein the point light source is installed at a corner of the light guide panel.

12. The backlight unit as claimed in claim 11, wherein the corner is chamfered.

13. The backlight unit as claimed in claim 7, wherein the point light source is installed at an edge of the light guide panel.

14. The backlight unit as claimed in claim 13, wherein a diffusion member diffusing light emitted from the point light source is further provided between the point light source and the light guide panel.

15. The backlight unit as claimed in claim 1, wherein the light guide panel further includes a reflection panel disposed at a lower surface of the holographic pattern.

16. The backlight unit as claimed in claim 15, wherein the reflection panel reflects light diffracted by the holographic pattern toward a light exhaust surface of the light guide panel.

17. The backlight unit as claimed in claim 7, wherein the light guide panel further includes a reflection panel disposed at a lower surface of the holographic pattern.

18. The backlight unit as claimed in claim 17, wherein the reflection panel reflects light diffracted by the holographic pattern toward a light exhaust surface of the light guide panel.

19. A backlight unit comprising:
a light source emitting light; and
a light panel comprising:
a holographic pattern having a concentric circle shape with a center at the light source; and
a reflection panel disposed at a lower surface of the holographic pattern, wherein the holographic pattern comprises a diffraction grating having a period of about 2 μm or less and a depth of about 0.2 μm or less.

20. The backlight unit as claimed in claim 19, wherein the reflection panel reflects light diffracted by the holographic pattern toward a light exhaust surface of the light panel.

21. The backlight unit as claimed in claim 19, wherein the light panel guides light emitted from the light source.

22. The backlight unit as claimed in claim 7, wherein the light panel has a light exhaust surface and the diffraction grating has the shape of the polygon when viewed from a direction substantially parallel to a direction normal of the light exhaust surface.

23. A backlight unit comprising:
a point light source emitting light; and
a light guide panel including a holographic pattern formed to have a concentric circle shape having a center at the point light source, wherein a concave lens diffusing light emitted from the point light source is further provided between the point light source and the light guide panel.

* * * * *